United States Patent Office 3,660,452
Patented May 2, 1972

3,660,452
SILOXANE AMINO HYDROXY SULFONATES
Edward Lewis Morehouse, New City, N.Y., assignor to
Union Carbide Corporation
No Drawing. Filed Apr. 30, 1968, Ser. No. 725,524
Int. Cl. C07f 7/02
U.S. Cl. 260—448.2 N                                    8 Claims

ABSTRACT OF THE DISCLOSURE

This invention relates to novel siloxanes having a sulfonate group linked to silicon through an organic group having an amino nitrogen and a hydroxyl substituent. The novel siloxanes are surfactants useful as additives to aqueous liquids (such as aqueous protein fire fighting compositions) to promote foaming, as wetting agents for organic surfaces (such as polyethylene) and as sequestering agents for metals (such as copper). The novel siloxanes are produced by reacting a primary or secondary amine sulfonate with an epoxy-organosiloxane.

CROSS REFERENCES TO RELATED APPLICATIONS

Novel siloxanes of this invention are useful in the fire fighting compositions disclosed and claimed in application Serial No. 725,534 filed concurrently herewith in the names of M. R. Rosen et al., entitled "Method of Extinguishing Liquid Hydrocarbon Fire and Composition Therefor."

This invention relates to novel siloxanes containing a group represented by the formula:

$$M\left[\begin{array}{c} R'' \; R^\sigma_b \\ | \; | \\ O_3SRNR'SiO_{\frac{3-b}{2}} \end{array}\right]_a \quad (1)$$

wherein M is a cation having a valence of $a$, $a$ is 1 to 4 inclusive, $b$ is 0 to 2 inclusive, R is a divalent hydrocarbon group, R' is a hydroxy-substituted alkylene group or a hydroxy-substituted alkyleneoxyalkyl group, the hydroxyl substituent on R' and the nitrogen atom in the

group are attached to adjacent carbon atoms of R', R'' is hydrogen, a monovalent hydrocarbon group free of aliphatic carbon to carbon multiple bonds or

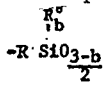

and R° is a monovalent hydrocarbon group free of aliphatic carbon to carbon multiple bonds.

The following are illustrative of the various groups represented by the symbols in Formula 1 above: M can be a monovalent metal cation such as sodium, potassium, lithium, cesium, or another monovalent cation such as ammonium or tetraalkyl ammonium (wherein the alkyl groups contain 1 to 18 carbon atoms) or a divalent metal cation such as barium, calcium, strontium, zinc, cadmium, magnesium, iron, cobalt, nickel, copper, tin, lead, mercury and the like, R can be a lower alkylene group (e.g., ethylene, propylene, or butylene) or arylene (e.g., phenylene), R'' and R° can be a lower alkyl group such as methyl, ethyl, propyl, cyclopentyl, butyl, amyl, octyl, cyclohexyl, isopropyl, tert-butyl, isooctyl and the like, an aryl group such as phenyl, biphenyl, naphthyl and the like or an aralkyl group such as benzyl, betaphenylethyl, beta-phenylpropyl and the like. R' can be a hydroxy-substituted linear or cyclic lower alkylene group or a hydroxy-substituted linear or cyclic lower alkyleneoxyalkylene group. More specifically, R' can be

—CH$_2$CH(OH)OCH$_2$CH$_2$—

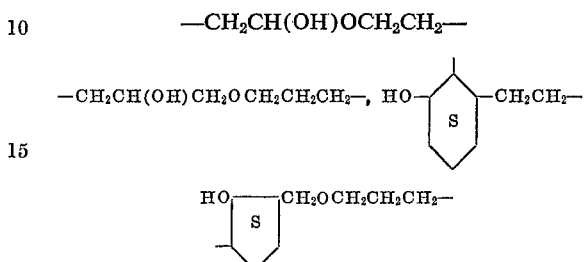

and the like.

The novel siloxanes of this invention include siloxanes that contain only groups represented by Formula 1 above and also siloxanes containing from 1 to 99 mol percent (preferably from 5 to 50 mol percent) of such groups and from 1 to 99 mol percent (preferably from 50 to 95 mol percent) of groups represented by the formula:

$$R_o'''SiO_{\frac{4-c}{2}} \quad (2)$$

wherein R''' is hydrogen, a lower alkoxy group (e.g., methoxy, propoxy, butoxy, etc.) or a monovalent hydrocarbon group as defined for R° above and $c$ is 1 to 3 inclusive.

Preferred siloxanes of this invention are those containing groups having the formula

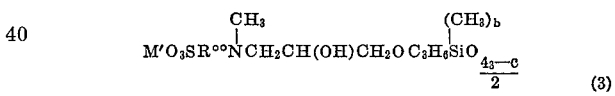

or the formula

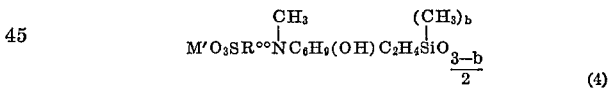

wherein M' is an alkali metal, R°° is a lower alkylene or phenylene group, and $b$ is 0 to 2 inclusive.

Especially preferred siloxanes of this invention are those represented by the formulae:

$(CH_3)_3SiO[(CH_3)_2SiO]_xZ_ySi(CH_3)_3$  (5)

wherein $x$ is 0 to 250, $y$ is 1 to 50 and Z is a group represented by Formula 3 or 4 where $b$ is 1.

The siloxanes of this invention can be produced by reacting a primary or secondary amine sulfonate with an epoxy-organosiloxane. This reaction can be illustrated by the equation:

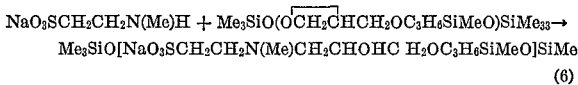

(6)

The primary and secondary amine sulfonates useful in producing the siloxanes of this invention are represented by the formula:

$$\text{M}[\text{O}_3\text{SRNH}]_a^{\overset{\displaystyle Y}{|}}$$

wherein M, R, and $a$ have the above-defined meanings and Y is hydrogen or a monovalent hydrocarbon group free of aliphatic carbon to carbon multiple bonds, as defined for R° above. These amine sulfonates can be produced by known methods such as by reacting a primary amine with a hydroxy hydrocarbylsulfonate or by reacting a sulfone with a primary amine to form an amino hydrocarbylsulfonic acid which can be reacted with a base to form the sulfonate. Other methods of producing these amine sulfonates are by reacting an aryl amine with sulfuric acid followed by neutralization and by sulfonating a nitroaryl compound followed by reduction and neutralization.

The epoxy-organosiloxanes useful in producing the siloxanes of this invention have a linear or cyclic epoxidized alkyl or alkyloxyalkylene group bonded to silicon. Such siloxanes are prepared by the reaction of an olefinically unsaturated epoxide with a siloxane having SiH in the presence of platinum catalyst. Such epoxyorganosiloxanes are characterized by having at least one group of the formula:

$$\text{E}'-\overset{\displaystyle R_b^\circ}{\underset{\displaystyle}{\text{Si}}}\text{O}_{\frac{3-b}{2}}$$

wherein E' is a monovalent epoxy-containing group such as epoxyalkyl (e.g., 3,4-epoxybutyl, 2,3-epoxypropyl, and 3,4-epoxy-3-methylbutyl); epoxyalkoxyalkyl (e.g., glycidoxypropyl, 3,4-epoxybutoxybutyl and 1,2-epoxyethoxyethyl); epoxycycloalkyl (e.g., beta-3,4-epoxycyclohexylethyl, 3,4-epoxycyclohexyl, gamma-3,4-epoxycyclohexylpropyl, 2,3-epoxycyclopentylmethyl, 2,3-epoxycyclobutyl and the like) and epoxycycloalkoxyalkyl (e.g., 2,3-epoxycyclopentyloxypropyl, 2,3-epoxycyclopentyloxyethyl, 3,4-epoxycyclohexyloxyethyl, 3,4 - epoxycyclohexylmethoxyethyl, 2,3-epoxycyclopentylmethoxypropyl, and the like), and R° and $b$ are as defined above. These epoxy-organosiloxanes can also contain groups represented by Formula 2 above.

The siloxanes of this invention can be produced by reacting the primary or secondary amine sulfate with the epoxy-organosiloxane under any suitable conditions. Although the reaction can be conducted without solvent, a solvent is preferable to increase the compatibility of reactants and, in some instances, to reduce the possibility of crosslinked structure where organo-functionality is relatively high. Useful solvents are water, ethanol and other alcohols, aromatics such as toluene and alkanes such as n-heptane. Usually relatively polar solvents are preferred, particularly those containing hydroxyl groups. Such solvents not only promote compatibility but also may be catalysts for the epoxy-amino reaction. Water, methanol, ethanol and isopropanol are particularly useful in the preparation of siloxanes of this invention. The polar solvents of this type also act as catalysts in mixed solvent systems involving liquids of relatively low polarity. The reaction can be run over a wide range of pH's, such as from about 12 to 6. The preferred range is about 10.5 to about 7.0. At higher pH's there can be a substantial amount of siloxane cleavage. At lower pH's the siloxane product may precipitate and hinder the rate of reaction. Regardless of the pH at which reaction is conducted, a subsequent adjustment of pH after completion of reaction may be desirable to obtain certain properties or optimum stability. For water-soluble amphoteric siloxane products intended for use as foam promoters, it has been observed that maximum foaming is obtained at a slight degree of alkalinity. Preferred reaction temperatures are 40 to 110° C. The reactions sometimes will proceed at room temperature and lower, and above 110° C. but there is no advantage to these conditions. Either reactant may be added to the other in increments while maintaining reaction temperature. Optionally, both reactants may be mixed together and heated to a temperature at which the rate of reaction is satisfactory. A slight excess of the primary or secondary amine sulfonate is preferred to assure more effective and more complete reaction of epoxy groups of the epoxy-organosiloxane. But such stoichiometry is not narrowly critical. When a primary amine sulfonate is used, the siloxane product will contain a group represented by Formula 1 where R" is hydrogen or $$-\overset{\displaystyle R_b^\circ}{\underset{\displaystyle}{\text{RSi}}}\text{O}_{\frac{3-b}{2}}$$

depending on the ratio of amine sulfate and epoxy groups in the mixture.

Siloxanes containing from 1 to 3 units represented by Formula 1 above where $b$ is 1 endblocked with units by Formula 2 above where $c$ is 3, are particularly useful in the fire fighting compositions disclosed in above-mentioned application Ser. No. 725,534. Preferred siloxanes in such fire fighting compositions are those represented by Formula 5 above where $x$ is 0 and $y$ is 1 to 3 inclusive.

The siloxanes of this invention are useful surfactants in liquids in which they are soluble. The water-soluble siloxanes are useful as profoamers for aqueous systems and improve the wetting of polyethylene and other organic surfaces by aqueous solutions. The siloxanes can also be used as chelating agents for metals such as copper. The siloxane liquids, resins and gums of this invention are also useful in the same general areas as conventional siloxane liquids, resins and gums.

The following examples illustrate the present invention.

As used herein, "Me" denotes the methyl group and "g." denotes grams.

EXAMPLE I

An epoxy-organosiloxane of the average composition $$\text{Me}_3\text{SiO}(\text{Me}_2\text{SiO})_{13}\left(\underset{\displaystyle \overset{\displaystyle |}{\text{L}_\text{O}\text{J}}}{\text{CH}_2\text{CHCH}_2\text{O C}_3\text{H}_6\text{SiMeO}}\right)_{5.5}\text{SiMe}_3$$

(59 g., 0.15 mole of the oxirane group) was dissolved in 100 milliliters of ethanol in a 500-milliliter flask equipped with stirrer, thermometer, heating mantel and water condenser. This siloxane had been prepared by a platinum-catalyzed addition of allyl-glycidyl ether to a hydrosiloxane. Aqueous sodium salt of "N-methyl taurine" (a thick aqueous slurry containing 64–66% sodium N-methyl taurate, NaO$_3$SC$_2$H$_4$N(Me)H) [40 g., 0.16 mole of nitrogen], was titrated with concentrated hydrochloric acid to a pH of 10.5, and then added as a slurry to the siloxane solution at 26° C. After 12 minutes of stirring of the reaction mixture the temperature has risen to 30° C., but the mixture was not soluble in water. The mixture was heated to 80° C. over a period of 17 minutes. After three minutes at this temperature, the product was completely water-soluble. Twenty-five milliliters of water were added and the mixture filtered. The filtate was a solution of an amphoteric siloxane of this invention of the average composition:

Me$_3$SiO(Me$_2$SiO)$_{13}$[NaO$_3$SCH$_2$CH$_2$N(Me)CH$_2$CH
(OH)CH$_2$OC$_3$H$_6$SiMeO]$_{5.5}$SiMe$_3$

This siloxane was very water-soluble and a good profoamer in water. One weight percent of the product in water provided an aqueous surface tension of 31 dynes per centimeter.

The use of the siloxane produced as described above as a chelating agent for metals was demonstrated. To several milligrams of copper sulfate dissolved in three milliliters of distilled water was added 1.5 milliliters of the siloxane. The pH was adjusted to between 10 and 11 with sodium hydroxide. The resultant product was a deep blue solution. Copper hydroxide did not precipitate. The sodium ion of the siloxane was replaced by cupric ion and a soluble coordination compound of copper was formed. A control test run under the same conditions, but without the siloxane, resulted in a precipitate of copper hydroxide.

EXAMPLE II

To the aqueous sodium salt of N-methyl taurine [described in Example I above] (39 g., 0.16 mole of nitrogen) concentrated hydrochloric acid was added until the pH was 10.3. The resultant slurry was added to an epoxy-organosiloxane of the composition

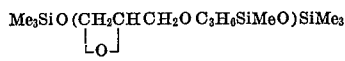

(48 g., 0.14 mole of the oxirane group) in 80 milliliters of ethanol. The reaction mixture was heated at 80° C. for about 25 minutes. Forty-five milliliters of distilled water were added and the product filtered. The filtrate was a solution of an amphoteric siloxane of this invention having the formula:

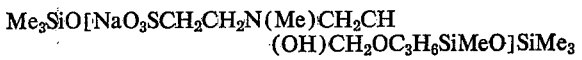

This siloxane was soluble in water and a good profoamer in water. At a concentration of one weight percent it provided an aqueous surface tension of 20.9 dynes/centimeter. The amphoteric nature of this siloxane product was demonstrated by precipitation of the siloxane by addition of hydrochloric acid followed by dissolving the precipitate with sodium hydroxide. Whereas the surfactant in its soluble form was a good profoamer, the precipitate was a very poor profoamer. The siloxane product also was an excellent wetting agent for water on polyethylene. Whereas a drop of distilled water after three minutes contact on polyethylene sheet had a drop diameter of 5.4 millimeters, under similar conditions distilled water containing only 0.1 weight percent of the siloxane product spread to a drop diameter of 18.9 millimeters.

EXAMPLE III

Aqueous sodium hydroxide was added to sulfanilic acid (HO₃SC₆H₄NH₂) (34 g., 0.18 mole) in water until the pH was 9. The resultant slurry was mixed with an epoxy-organosiloxane of the composition

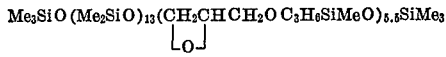

(66 g., 0.16 mole of the oxirane group) and 100 milliliters of ethanol. The reaction mixture was heated at 80° C. for 1.5 hours. One gram of triethylamine was added to raise the basicity slightly and heating continued. The product was a diluted amphoteric siloxane surfactant of this invention substantially of the composition

Although the product did not dissolve completely in water, giving a haze, the surfactant was a good aqueous profoamer.

EXAMPLE IV

A slurry of the aqueous sodium salt of N-methyl taurine (96.5 g., 0.39 mole of N) was treated with hydrochloric acid to a pH of 10.0. The partially neutralized slurry was added to a solution of an epoxyorgano-siloxane of average composition

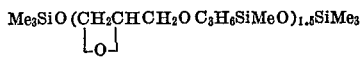

(100 g., 0.36 mole of the oxirane group) in 180 milliliters of isopropanol. The reaction mixture was heated at reflux for one hour, then 40 milliliters of water added to obtain a clear solution. This was filtered and the product filtrate adjusted to pH 8.5. The final product was a solution of an amphoteric siloxane surfactant of this invention having the average composition

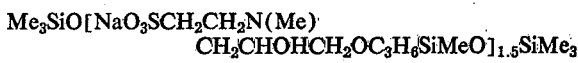

This siloxane was water-soluble and a good profoamer for water.

What is claimed is:
1. A siloxane selected from the group consisting of:
  (a) siloxanes consisting essentially of groups represented by the formula:

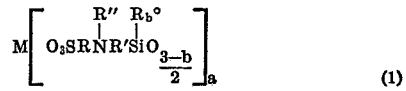

wherein M is sodium, potassium, lithium, cesium, ammonium, tetraalkyl ammonium (wherein each alkyl group contains from 1 to 18 carbon atoms), barium or calcium cation having a valence of $a$, $a$ is 1 to 2 inclusive, $b$ is 1 or 2, R is a lower alkylene or an arylene group, R' is a hydroxy-substituted lower alkylene group or a hydroxy-substituted lower alkyleneoxyalkyl group, the hydroxyl substituent on R' and the nitrogen atom in the

group are attached to adjacent carbon atoms of R', R'' is hydrogen, a lower alkyl group, or

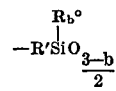

and R° is a lower alkyl, phenyl, or beta-phenylethyl group; and
  (b) siloxanes consisting essentially of from 1 to 99 mole percent of groups represented by Formula 1 above and from 1 to 99 mole percent of groups represented by the formula:

wherein R''' is hydrogen, a lower alkoxy group or R° and $c$ is 2 or 3.

2. A siloxane as defined in claim 1 wherein the group represented by Formula 1 is more specifically represented by the formula:

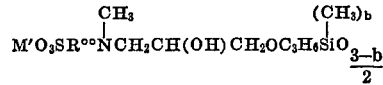

wherein M' is an alkali metal, R°° is a lower alkylene or a phenylene group and $b$ is 1.

3. A siloxane as defined in claim 1 wherein the group represented by Formula 1 is more specifically represented by the formula:

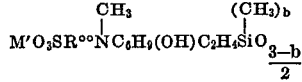

wherein M' is an alkali metal, R°° is a lower alkylene or a phenylene group and $b$ is 1.

4. A siloxane as defined in claim 1 represented by the formula:

$(CH_3)_3SiO[(CH_3)_2SiO_x[Z]_ySi(CH_3)_3$ wherein Z has the formula of claim 2 where $x$ is 0 to 250 inclusive and $y$ is 1 to 50 inclusive.

5. A siloxane as defined in claim 1 represented by the formula:

$$(CH_3)_3SiO[(CH_3)_2SiO]_x[Z]_ySi(CH_3)_3$$

wherein Z has the formula of claim 3 where $x$ is 0 to 250 inclusive and $y$ is 1 to 50 inclusive.

6. A siloxane as defined in claim 4 wherein $x$ is 0 and $y$ is 1 to 3 inclusive.

7. A siloxane as defined in claim 5 wherein $x$ is 0 and $y$ is 1 to 3 inclusive.

8. A siloxane as defined in claim 1 having the formula:

$$Me_3SiO[NaO_3SCH_2CH_2N(Me)CH_2CH(OH)CH_2OC_3H_6SiMeO]SiMe_3$$

References Cited
UNITED STATES PATENTS 3,215,643  11/1965  Pail _____ 260—448.2 X
3,328,449  6/1967  Haluska _____ 260—448.2

TOBIAS E. LEVOW, Primary Examiner
W. F. W. BELLAMY, Assistant Examiner

U.S. Cl. X.R.

252—3; 260—429.7, 429.9, 439, 435, 438.1, 429, 431. 46.5 E

PO-1050
(5/69)

UNITED STATES PATENT OFFICE
CERTIFICATE OF CORRECTION

Patent No. 3,660,452               Dated May 2, 1972

Inventor(s) Edward Lewis Morehouse

It is certified that error appears in the above-identified patent and that said Letters Patent are hereby corrected as shown below:

Col. 2, line 63, the terminal portion of the formula immediately preceding the arrow should read -- $SiMe_3$ --.

Col. 2, line 64, the terminal portion of the formula should read -- $SiMe_3$ --.

Col. 6, line 73, the symbol "]" should appear immediately before the subscript "x".

Signed and Sealed this sixth Day of January 1976

[SEAL]

Attest:

RUTH C. MASON
Attesting Officer

C. MARSHALL DANN
Commissioner of Patents and Trademarks